(12) United States Patent
Fodere et al.

(10) Patent No.: US 11,398,907 B1
(45) Date of Patent: Jul. 26, 2022

(54) SYSTEM AND METHOD FOR IMPLEMENTING LIVE AUDITION RECORDING AND VERIFICATION

(71) Applicant: HEARTOUT CORPORATION, Miami, FL (US)

(72) Inventors: Ciro Fodere, Miami, FL (US); Santiago Bertinat, Montevideo (UY); Juan Pablo Balarini, Montevideo (UY)

(73) Assignee: HEARTOUT CORPORATION, Miami, FL (US)

( * ) Notice: Subject to any disclaimer, the term of this patent is extended or adjusted under 35 U.S.C. 154(b) by 615 days.

(21) Appl. No.: 16/431,764

(22) Filed: Jun. 5, 2019

Related U.S. Application Data

(60) Provisional application No. 62/681,114, filed on Jun. 6, 2018.

(51) Int. Cl.
| | |
|---|---|
| *G06F 16/70* | (2019.01) |
| *H04L 9/32* | (2006.01) |
| *G06F 16/74* | (2019.01) |
| *G06F 16/735* | (2019.01) |
| *G06F 16/71* | (2019.01) |
| *H04L 9/30* | (2006.01) |

(52) U.S. Cl.
CPC ............ *H04L 9/3213* (2013.01); *G06F 16/71* (2019.01); *G06F 16/735* (2019.01); *G06F 16/748* (2019.01)

(58) Field of Classification Search
CPC ....... G06F 16/71; G06F 16/735; G06F 16/748
See application file for complete search history.

(56) References Cited

U.S. PATENT DOCUMENTS

| | | | | |
|---|---|---|---|---|
| 2003/0065922 | A1* | 4/2003 | Fredlund | H04L 63/0823 713/176 |
| 2011/0167069 | A1* | 7/2011 | Libich | G06F 16/78 707/754 |
| 2018/0060552 | A1* | 3/2018 | Pellom | G06F 21/32 |

* cited by examiner

*Primary Examiner* — Kristopher Andersen
(74) *Attorney, Agent, or Firm* — Liang & Hennessey LLP

(57) ABSTRACT

A method of verifying a recording of a live audition is provided that includes creating, by an audition server, an audition token associated with the live audition. The method includes saving a first record of the audition token and sending the audition token to a user device of a performer. The method includes receiving, by the audition server from the user device, the recording of the live audition associated with a received token. The method includes comparing a second record of the received token to the first record and verifying the recording of the live audition when the second record matches the first record. A system for verifying a recording of a live audition is provided. A live audition computer-implemented system is provided that includes an organizer database, a candidate database, and a recording and verification module to verify the recording as a unique trial.

17 Claims, 5 Drawing Sheets

SYSTEM AND METHOD FOR IMPLEMENTING LIVE AUDITION RECORDING AND VERIFICATION

CROSS-REFERENCE TO RELATED APPLICATIONS

The present application claims the benefit of U.S. Provisional Patent Application No. 62/681,114, filed Jun. 6, 2018, entitled "SYSTEM AND METHOD FOR IMPLEMENTING LIVE AUDITION RECORDING AND VERIFICATION", which is incorporated by reference in its entirety.

BACKGROUND OF THE INVENTION

1. Field of the Invention

The present invention relates to recording live auditions, and in particular provides a new technical solution for recording a live performance and authenticating and verifying that the performance is live using a smartphone, tablet or other mobile processing device.

2. Description of the Related Art

Currently, the recording technology used in auditions cannot guarantee that the respective recording has not been tampered with. This represents a major problem in accurately assessing the quality and fairness of the evaluation process of a musical performance. The most crucial aspect in judging such a performance is being able to see the artistic act in its purest form as well as the response and performance of the artist in real time under pressure that best emulates real life performances. Currently, the system of audition recordings is outdated for the Internet era. It has remained unchanged for decades. The only innovation can be found in formats from one decade to another, but referring strictly to the artistic process itself, the system has remained unchanged: no matter what the format (Cassette, Laser Disc, or mp3), it is recorded multiple times and edited. Live auditions are crucial as it is the only way to assess the artistic ability and stage handling of the performer. Due to the present technology, audition judges will be able to assess a replication of the experience of a live audition in a recording.

SUMMARY OF THE INVENTION

According to exemplary embodiments a method of verifying a recording of a live audition is provided that includes creating, by an audition server, an audition token associated with the live audition. The exemplary method also includes saving, in a database coupled to the audition server, a first record of the audition token, and sending, by the audition server, the audition token to a user device of a performer. The method further includes receiving, by the audition server from the user device, the recording of the live audition associated with a received token. Additionally, the method includes comparing a second record of the received token to the first record and verifying the recording of the live audition when the second record matches the first record.

In exemplary embodiments of the method, the audition token is hashed and salted to form the first record, and the received token is hashed and salted to form the second record.

Further exemplary embodiments of the method include communicating by the audition server to the user device a tutorial for display on the user device prior the live audition.

The exemplary method may include communicating by the audition server to the user device instructions to delete the audition token after a trial.

Additional exemplary embodiments of the method include encrypting communications from the audition server to the user device, and decrypting communications received by the audition server from the user device.

Further exemplary methods may include creating, by the audition server, a further audition token associated with the live audition, and saving, in the database coupled to the audition server, a further first record of the further audition token. The further exemplary method may also include sending, by the audition server, the further audition token to the user device of the performer, and receiving, by the audition server from the user device, a further recording of the live audition associated with a further received token. The further exemplary methods may include comparing a further second record of the further received token to the further first record and verifying the further recording of the live audition when the further second record matches the further first record.

The exemplary method may include receiving, by the audition server from the user device, a selection between the recording and the further recording for submission to the live audition. Additionally, in the exemplary method the creating of the further audition token may be in response to an administrator action.

An exemplary system for verifying a recording of a live audition is provided that includes an audition server configured to create an audition token associated with the live audition, and a database coupled to the audition server and configured to save a first record of the audition token. The system may further include a communication interface coupled to the audition server and configured to send the audition token to a user device of a performer. The communication interface may be further configured to receive, from the user device, the recording of the live audition associated with a received token. The system may additionally include a processor configured to compare a second record of the received token to the first record and verify the recording of the live audition when the second record matches the first record.

A live audition computer-implemented system is provided that includes an organizer database adapted to receive information via an application programming interface (API) from an organizer mobile interface. The exemplary system also includes a candidate database adapted to receive information via the API from a candidate mobile device. The exemplary system further includes a recording and verification module adapted to receive a recording from the candidate mobile device, verify the recording as a unique trial, and provide the recording to the organizer via the organizer mobile interface.

The recording and verification module may be further configured to generate a unique identifier and communicate the unique identifier to the candidate mobile device. The recording received from the candidate mobile device may include an associated received unique identifier, and the recording and verification module may be further configured verify the recording as a unique trial by comparing the unique identifier and the associated received unique identifier.

These and other advantages of the present technology will be apparent when reference is made to the accompanying drawings and the following description.

DETAILED DESCRIPTION OF THE INVENTION

Figure 1:
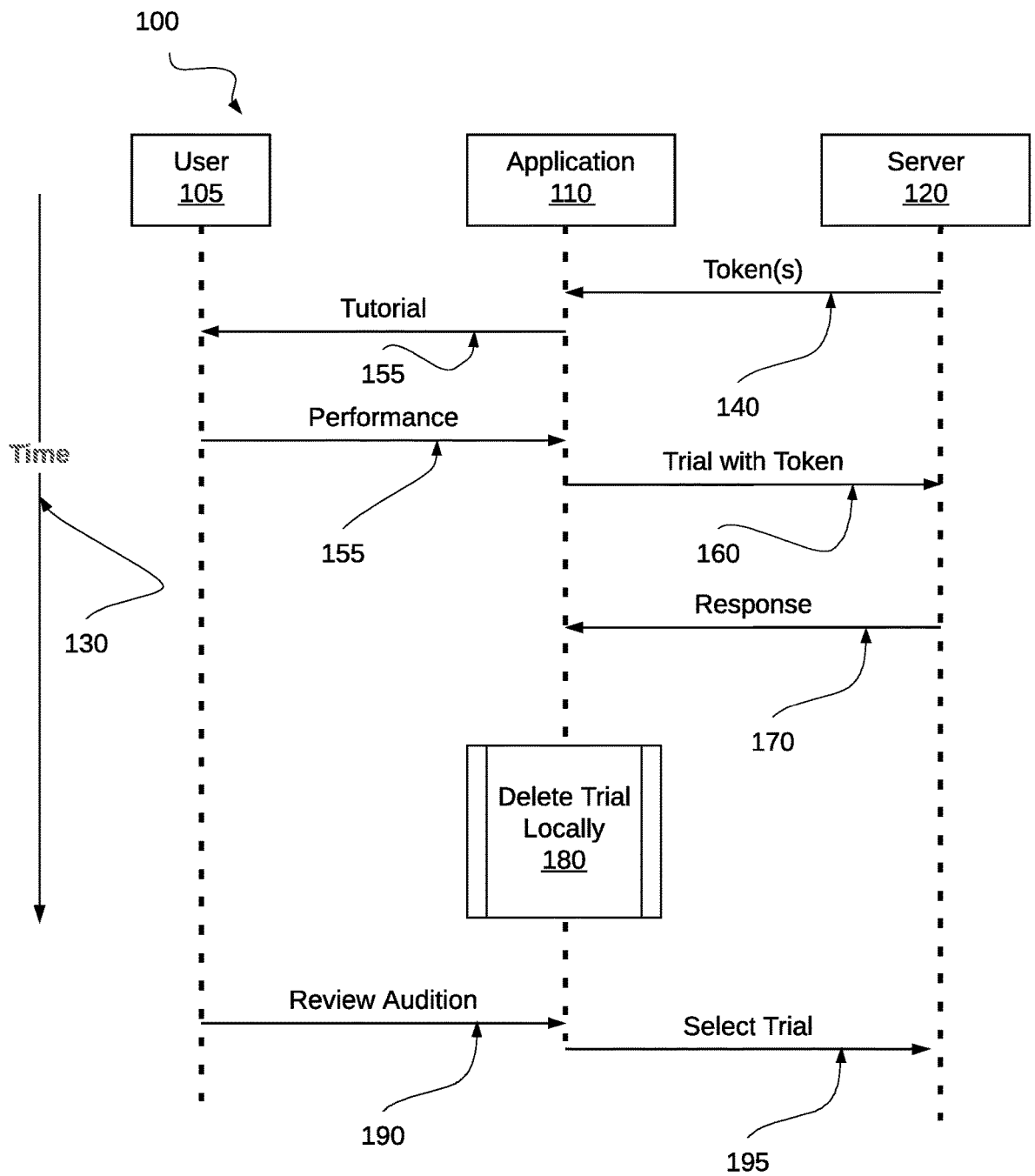
FIG. 1 is a time diagram showing actions between the user, the mobile application, and the audition server for normal operations.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The present invention relates to recording live auditions, and in particular provides a new technical solution for recording a live performance and authenticating and verifying that the performance is live using a smartphone, tablet or other mobile processing device. A "live audition" application (also referred to as an app) is provided for performing arts organizations. The app allows applicants to record themselves online, in real time, to replicate a true live performance. The present invention is relevant in the context of a technology trend guided towards the veracity of the process and authenticity, by preventing artistic fiction and manipulation of the works through audio and video editors.

With the present technology, an organizer of an audition can decide whether to allow the competitor to record many times. For example, the organizer may allow the competitor to record up to five times. The organizer may also select whether the audition should be recorded in the traditional way, and/or with editing, or whether to require the recording to be "live". The "live" recording option allows the performer to only make one recording. Organizers of competitive artistic events are motivated to use recordings systems that guarantee a one-time recording rather than those that allow tampering.

The present technology guarantees that the recording was made in real time and without manipulation. For the organizer, this technology replicates the advantages of a standard recording, e.g. judging on their own time. For the applicant, the present technology recreates the experience, pressure, and unexpectedness of a live audition-performance. Judging based on recordings made using the present technology may include performance quality, concentration, preparedness, and excitement, which are all important elements to hear in an artist. The selection process will be fair, since candidates will be judged on a true "live audition" experience, all under the same conditions.

The present technology may be used in festivals, competitions, orchestras, universities, dance schools, ballet companies, and television performance programs such as "The Voice" and "America's got Talent". The present technology could replace live, preliminary auditions and reduce the costs for both the organizations and the participants.

An audition may be arranged on the exemplary system by an audition organizer (also referred to as an organizer, administrator, or audition presenter) which has one or more trials. In order to ensure fairness and replicate live audition conditions, the system ensures that a user does not record the same trial several times, unless specifically authorized. In this manner, the system guarantees that the audition trial was live and that the user did not record it several times until everything went perfect. The recording method begins when an administrator or audition presenter creates an audition trial in a backend server. This process involves saving initial information on the audition trial in a data base of audition trials. Various information associated with the audition trial may be included, including number of trials allowed, instrument type, musical score, style suggestions, and/or any other audition requirements.

The flow indicates that the camera needs to be ready because the video camera is operated and records both the audio and video of the performance. The camera is directed at the performer, and framing requirements part of the tutorial pre-audition. A pause prior to starting ensures that the video feed can be controlled and the first frames are ready to be processed. The video preview enables the user/performer to arrange everything on the scene first (including instruments, background, lighting, etc), and also avoids some of the recording session being lost due to video input lag at the start.

Additionally, an organizer or other person, or the app administrator, may initiate a competition open to any user, or particular users at a certain age level. For example, the competition may be for children from ages 8 to 12. A winner may be determined by the organizer, administrator, or a designated judge or judges, and the winner's identity and age may be verified by using some type of identification upload, either by video, photograph, or any other appropriate method. In this manner, competitors are prevented from submitting different recordings since the same name and/or face would be associated with the different trials.

The performer is verified as being the person who is playing via identifiable information in a payment method and through the video showing the person playing the trial. A quick pan of the room may be required before starting the recording and/or facial close-ups before starting a trial session. Additionally, if someone attempts to record twice, judges would recognize the face, and the video of the hands, bow, or instrument during the playing, in conjunction with the sound of the performance, would preclude a performer attempting to use a recording playing elsewhere as the performance trial. Once a recording is made it uploads to the server with the token.

An audition may allow several trials, and this number is the maximum number of trials that a user can record. Each trial has a distinct token, which cannot be deleted, copied, or altered by a user/performer. A salted hash of the token is saved by the server. The token is required to submit a trial, so if it's deleted, updating the trial will be impossible. The trial saved in the device's persistent storage holds data locally while the device is unable to communicate to the server (for example, due to a lost internet connection). For this reason, the device's trial has some added attributes that allow the application to identify the current state of the audition's flow, and if at any point the system determines that an update is needed, it communicates the updates to the server. Once a user feels like a trial is correct, they can select it from the previously recorded and uploaded valid trials and submit the selected trial to the audition. It is not necessary to record all trials to submit a trial to an audition. The tokens are used to validate a trial to the audition server, and after that operation is complete, a performer may select among the valid trials for submission to an audition.

Errors which the user feels there is a legitimate reason for doing the trial over may be excused by an administrator, who can allow another audition by authorizing another token for the performer. Once the user reviews an audition which has an invalidated trial (meaning this invalidation was not communicated to the server), the application will immediately communicate this invalidation to the server, and if the communication is successful, delete the trial on the device. No further trials can be recorded if the invalidation can not be communicated successfully. It is also possible that the user deletes the token saved in the device by uninstalling the application, resetting the device, or deleting the application's data. Logging into another device may also have the same effect. In this case, the token is deleted permanently, and the trial is uneditable (both for invalidation or completion).

FIG. 1 shows time diagram 100 illustrating actions between user 105, mobile application 110, and audition server 120 for normal operations. Time arrow 130 indicates the passage of time. Server 120 creates a unique token (or unique identifier) that identifies the audition trial and which will be associated with a session the performer submits as a trial for the audition. The token may be alphanumeric, hexadecimal, or any other appropriate character string. The token may be generated using various random number or code generator, for instance, by ActiveSupport::SecureRandom.hex(n). In the case of ActiveSupport::SecureRandom.hex(n), 'n' may be selected equal to 16, resulting in a hexadecimal string of 32 random characters. A hash of the token is created, for example by using the BCrypt library, and possibly salted, and saved to the database, while the full token is sent to the application. Since the token is hashed and salted by the BCrypt library, someone with access to the database cannot retrieve the original token. The token or tokens are sent by server 120 to application 110 in communication 140. All communications to and from the backend server are encrypted using an HTTPS connection, rendering the interception of communications (and therefore token duplication) impossible.

User 105 (also referred to as the performer), who is interested in submitting an audition via application 110 for the trial, downloads application 110 to their mobile phone, tablet or computer (also referred to as the device, the user device, or the mobile device). The user device displays to user 105 tutorial 155, which includes step-by-step instructions to prepare for the recording. Tutorial 155 may be a video, a step-by-step click through guide, written description, or any other appropriate teaching method. Tutorial 155 may include various suggestions and/or commands for the performer, for instance to turn off any phones or other devices that may interrupt or degrade the performance and/or framing considerations for the video camera. Tutorial 155 may also give additional information to the performer to reduce the chance of errors in the audition, for instance by asking user 105 to check the battery level of the user device if battery operated. Additionally, tutorial 155 may ask the performer to switch their phone to airplane mode and to turn their Wi-Fi off prior to recording a performance trial. When user 105 is ready to do the audition, the performer waits for the camera to be available on the user device, and then starts the recording for performance 155.

Tutorial 155 may further ask the performer/user to, following a performance, turn their Wi-Fi on and wait for an internet connection to be available. Application 110 may request video resources from the TUS server. The audition server may be a general web server that handles all the business logic specific for the application, including the creation and verification of the audition token. In exemplary embodiments, the audition server may handle videos or other recordings of auditions, and may additionally function as the TUS server as described herein.

Alternatively, the TUS server may be completely independent from the audition server, and may be operated by a third party, for example Vimeo, or any other appropriate media server for storing media content. If the upload request is unsuccessful, the system will retry as needed. The system saves the resource identifier and uploads the link from the app. When an audition video is uploaded to VIMEO, the video is first created in VIMEO and then uploaded. Initially, VIMEO sends an identifier of the video, and this identifier is then used to upload the video content.

The audition trial with token are uploaded as video in parts to the TUS server until finished by communication 160. If the upload is interrupted or unsuccessful, the system retries or continues as needed until successful. For example, if the upload is interrupted, the upload resumes when user 105 reopens application 110 and tries to continue the audition. Once fully received from application 110, server 120 compares the received token with the saved versions of the token(s) sent to application 110 to initiate the process. This comparison may involve hashing and salting the received token to compare the result to a hashed and salted version of the token that was saved during the initial creation of the token(s) for the user 105. The audition trial is marked as completed if everything worked correctly, and response 170 is sent to the user device instructing application 110 to delete the trial on the device in operation 180.

Figure 2:
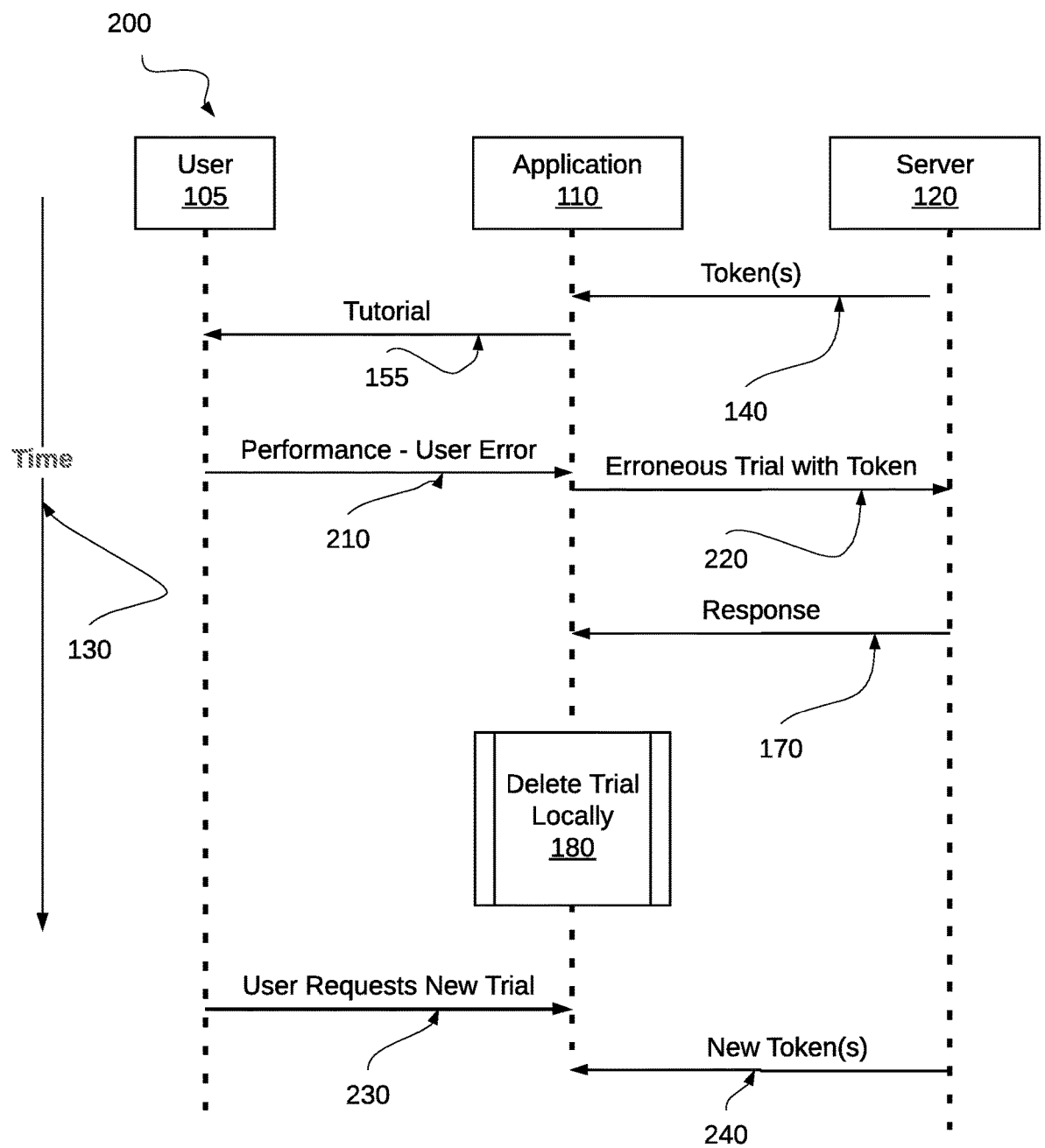
FIG. 2 is a time diagram showing actions between the user, the mobile application, and the audition server illustrating a performer error.

FIG. 2 shows time diagram 200 showing actions between user 105, application 110, and audition server 120 illustrating a performer error. The process up until the performance is the same in time diagram 200 as in time diagram 100 of FIG. 1. However, if any user errors (for instance, an incoming call sounds, an alarm sounds, and/or anything that sends the software application to a background state) occur while recording the performance, the trial is invalidated on the device's storage. The token created will be attached to the erroneous trial and thereby prevent the user from recording again. When attempting to continue with the audition or review the audition, the application will communicate the invalidation to the server in communication 220. After response 170 from server 120 indicating receipt, operation 180 is performed to delete the trial on the device, including the associated data and the token. This allows recording again only if remaining trials are available. The process is automatic and opaque to the user, meaning it will not be possible to edit the trial again, because the token does not exist anymore. It also will not be possible to login into another device, or reinstall the app, since the token wouldn't be available, making the trial impossible to update. If the error was excusable in some way, the user will need to contact an administrator or audition organizer in user request 230 to determine if the user can obtain new token(s) 240 to thereby record a new trial or trials.

Figure 3:
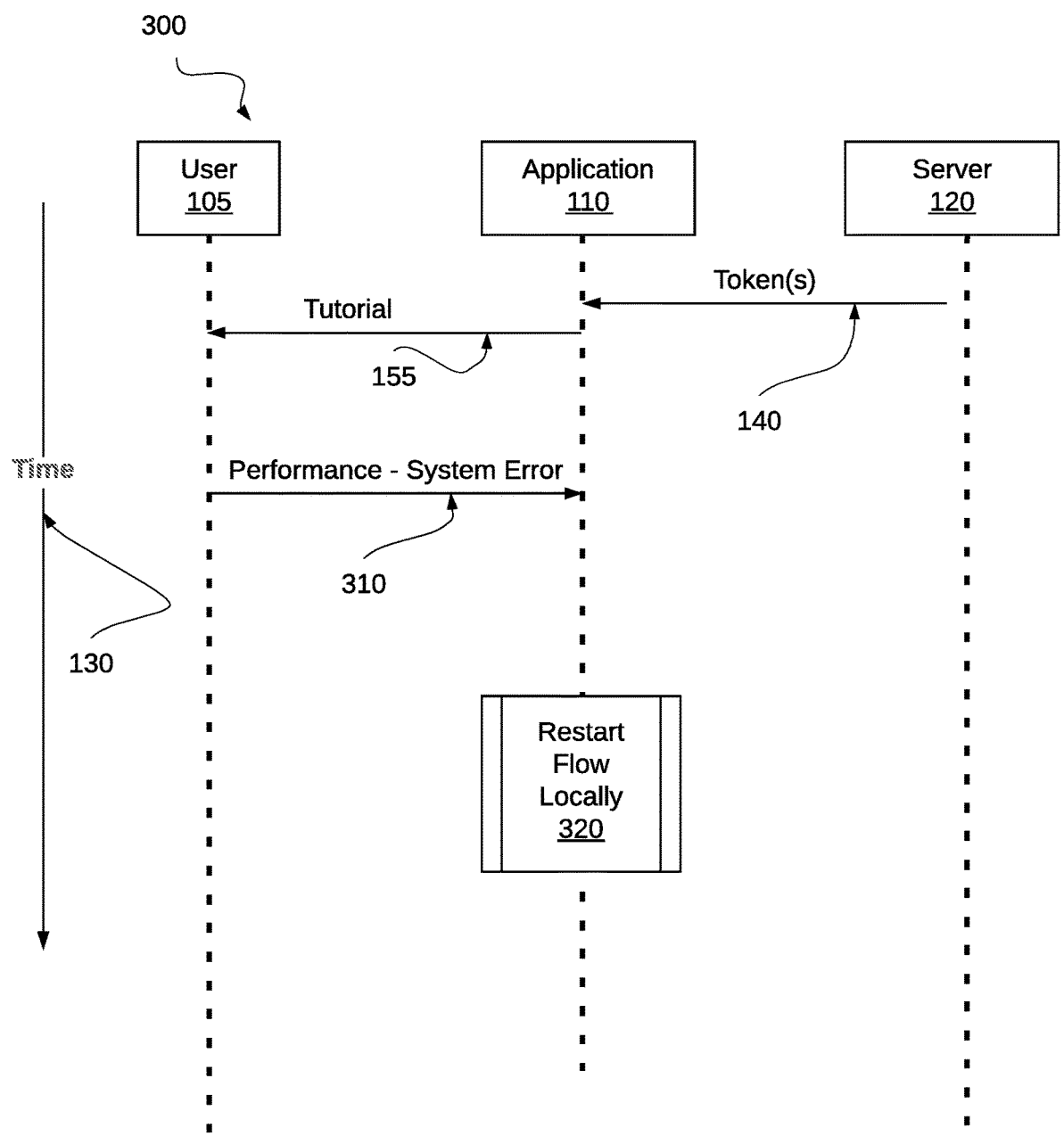
FIG. 3 is a time diagram showing actions between the user, the mobile application, and the audition server illustrating a system error.

FIG. 3 is time diagram 300 showing actions between user 105, application 110, and audition server 120 illustrating a performer error. If any device error occurs that is not due to user mistake occurs during the recording, the flow is restarted locally in operation 320, and the token is not attached to the recording. The flow is restarted and the user is not penalized. Instead of marking the trial as "invalid", it's marked as "starting", so the application does not send the invalidation notice upon review of the audition.

Application 110 may include three modules. One module may be for Administrators, and may include an Administrator Panel that is web based, or a web application. A second module may be an Organizer Panel, that may also be web based. A third module may be for students or competitors, which may be a downloadable user application for a mobile device.

Alternatively, the downloadable application may feature two separate platforms: one for organizers and one for applicants. Once the app is downloaded from an app store and installed on a mobile phone or other mobile processing device, the first thing that a user would see upon opening the app and registering, would be a choice to select one of the two platforms.

For Organizers the process may be as follows: download the app; choose "Organizer"; and create user profile (a user ID and password will be created for the organization/institution). This will be a one-time process at the beginning and will later be replaced with a sign-in (login) feature.

Then the organizer will have the choice of creating an event. Once the information about the event is inserted and reviewed, the user will click on "CREATE EVENT". The system then generates a unique number (or other unique identier, for example a QR code) that identifies the audition. That number can be advertised by the organizer to its applicants and will serve as the unique code that the applicants will use in order to access and apply to the specific audition. Organizers have the option to create multiple events. With the Manage event feature, organizers will be able to see, manage, and sort through the applicants, videos, and related material and data.

For Applicants the process may be as follows: download the app; choose "Applicant"; and create a user profile (a user ID and password will be created for the applicant). This will be a one-time process at the beginning and will later be replaced with a sign-in (login) feature.

Then the user will be asked to input the unique number of the specific event to which they want to apply. A test or tutorial mode is provided to reduce errors during the recording process. After selecting an audition by inputting a number or other identifier, candidates will watch a "demo video" to get an explanation of what the process will be like. Alternatively, the tutorial may be presented as a written description or click-through description. Following the demo video (or alternative tutorial), applicants will have a chance to test their video and audio systems on their mobile device by recording short (for example, 30 seconds) videos that they can play back. This playback opportunity enables the applicant to find the best spot, and/or angle for their phone to maximize the quality of the recording. The test mode videos will be available for playback but cannot be submitted. The applicants may be given an unlimited number of test mode videos before they start recording.

Once the user is sure that the audio/video features have been tested and work properly, he/she can start the recording. Once the recording starts, the system will not allow the candidate to record again, unless the organizer chooses a specific number of times that the candidate can record. The users may have 20 seconds (or some other predetermined time) at the beginning of the recording in which to cancel the recording in case a problem occurs. Alternatively, the recording may begin immediately upon activation. After the predetermined time period, the present technology will not allow the user to cancel without using the trial.

After the performer finishes recording, the candidate may have the option to save the trial video for personal use. The application automatically uploads the video to a centralized or cloud-based proprietary storage platform operated in conjunction with the app. In alternative exemplary embodiments, the user may have the option of not uploading the performance. If the performer chooses not to upload, they will not be able to apply to the audition unless multiple trials have been authorized by the organizer. If the candidate subsequently tries to re-do the process, they will not be able to, since the system will recognize that the user has already recorded for the given audition. When the video finishes uploading, the candidate will be done with the audition process.

The recordings will be organized by the present technology by a user dashboard, so that judges can login and listen to all of the applicants on their specific audition list.

The current online application process generates inconveniences and high costs in the industry. It is hoped that through the present technology, an organizer and/or candidate can save on recurring costs: coordination times, performance spaces, and candidate and jury travel expenses.

The platform may provide the following functions: user friendly layout; improvements to the development of recording and connectivity functions; blockchain integration for verification purposes; and integration with other online platforms.

The user experience may begin with a website landing page with information about the present application. The user then downloads a mobile application. The user can sign up for the app, sign in to the app, and change email and passwords. A user can also see a list of open competitions and competitions for which the user has submitted auditions. The user can also see details and results of competitions. Some audition contests may require a fee, which may be paid via the app. Further, some auditions may be by invitation only (private), and therefore may require a code or key to access. A user can record a test audition, submit any necessary information for an audition, view a tutorial (which may be a video, a written description, or a click-through description) on how to record an audition, record an audition for a private contest or a public competition, and/or redo an audition if it is allowed (or alternatively, record multiple versions of the same audition and select among them the particular one or more for submission).

An organizer may access the application via a website, and may create and edit private contests, create and edit public competitions, and may review auditions for both private contests (which will be identified by a specific code that each organizer will have and can provide to prospective contestants) and public competitions (which will not have a code). Public competitions may be organized by the application administrators, and may be accessed directly by users from the app on a mobile device. For public competitions, a performer may open the app, click on the competition tab or infom button, and follow the steps to apply and record.

A panel administrator can list, create, and/or update organizations and users able to access an organization's account. Additionally, an administrator can list, create, and/or update public competitions, private contests, user/performers, and audition trials.

Figure 4:
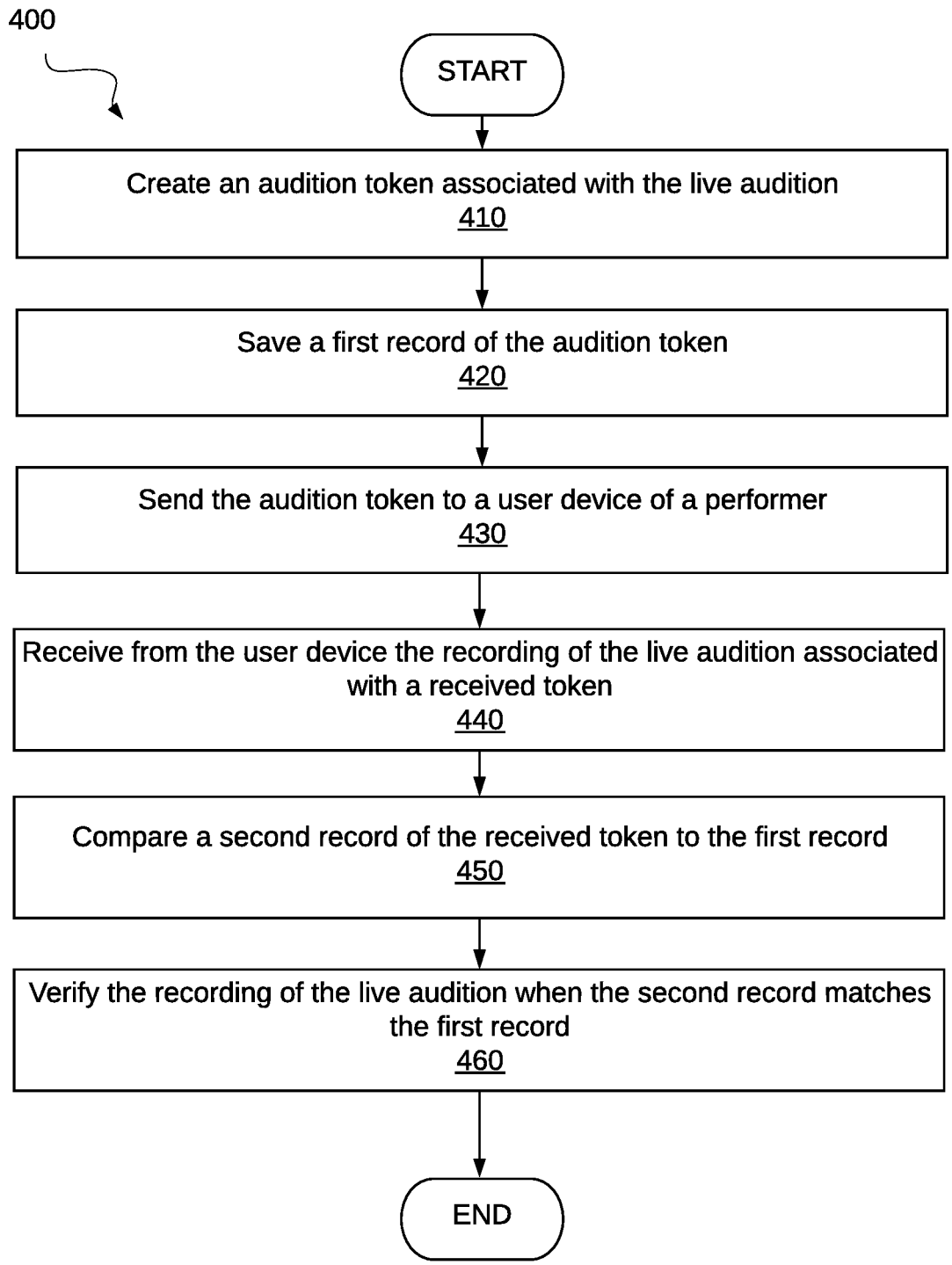
FIG. 4 is a flow chart illustrating an exemplary method according to the present invention.

FIG. 4 is a flow chart illustrating method 400 according to the present invention. The flow in method 400 flows from the start oval to operation 410, which indicates to create an audition token associated with a live audition. From operation 410, the flow in method 400 proceeds to operation 420, which indicates to save a first record of the audition token.

From operation 420, the flow proceeds to operation 430, which indicates to send the audition token to a user device of a performer. From operation 430, the flow in method 400 proceeds to operation 440, which indicates to receive from the user device the recording of the live audition associate with a received token. From operation 440, the flow proceeds to operation 450, which indicates to compare a second record of the received token to the first record. From operation 450, the flow in method 400 proceeds to operation 460, which indicates to verify the recording of the live audition when the second record matches the first record. From operation 460, the flow in method 400 proceeds to the end oval.

Figure 5:
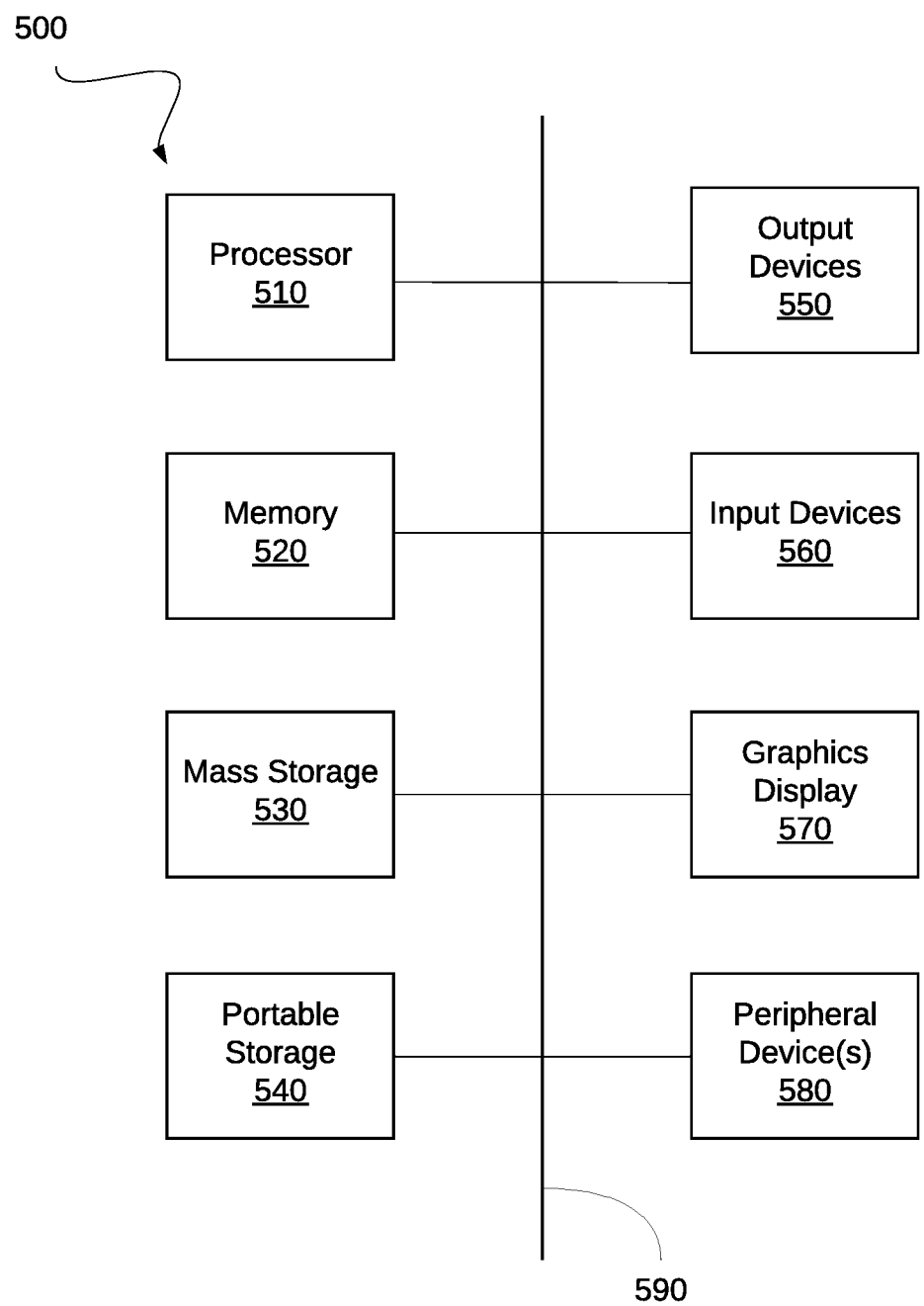
FIG. 5 is a schematic diagram of computing system used in an exemplary embodiment of the present invention.

FIG. 5 is a schematic diagram of computing system used in an exemplary embodiment of the present invention. FIG. 5 illustrates exemplary computing system 500, hereinafter system 500, that may be used to implement embodiments of the present invention. The system 500 may be implemented in the contexts of the likes of computing systems, networks, servers, or combinations thereof. The system 500 may include one or more processors 510 and memory 520. Memory 520 stores, in part, instructions and data for execution by processor 510. Memory 520 may store the executable code when in operation. The system 500 may further includes a mass storage device 530, portable storage device(s) 540, output devices 550, user input devices 560, a graphics display 570, and peripheral device(s) 580.

The components shown in FIG. 5 are depicted as being connected via a single bus 590. The components may be connected through one or more data transport means. Processor 510 and memory 520 may be connected via a local microprocessor bus, and the mass storage device 530, peripheral device(s) 580, portable storage device 540, and graphics display 570 may be connected via one or more input/output (I/O) buses.

Mass storage device 530, which may be implemented with a magnetic disk drive or an optical disk drive, is a non-volatile storage device for storing data and instructions for use by processor 510. Mass storage device 530 may store the system software for implementing embodiments of the present invention for purposes of loading that software into memory 520.

Portable storage device 540 operates in conjunction with a portable non-volatile storage medium, such as a floppy disk, compact disk, digital video disc, or USB storage device, to input and output data and code to and from the system. The system software for implementing embodiments of the present invention may be stored on such a portable medium and input to the system 500 via the portable storage device 540.

User input devices 560 provide a portion of a user interface. User input devices 560 may include one or more microphones, an alphanumeric keypad, such as a keyboard, for inputting alpha-numeric and other information, or a pointing device, such as a mouse, a trackball, stylus, or cursor direction keys. User input devices 560 may also include a touchscreen. Additionally, the system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripheral devices 580 may be included and may include any type of computer support device to add additional functionality to the computer system.

The components provided in the system 500 are those typically found in computer systems that may be suitable for use with embodiments of the present invention and are intended to represent a broad category of such computer components that are well known in the art. Thus, the system 500 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), Blu-ray Disc (BD), any other optical storage medium, RAM, PROM, EPROM, EEPROM, FLASH memory, and/or any other memory chip, module, or cartridge.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method of verifying a recording of a live audition, comprising:
    creating, by an audition server, an audition token associated with the live audition;
    saving, in a database coupled to the audition server, a first record of the audition token;
    sending, by the audition server, the audition token to a user device of a performer;
    receiving, by the audition server from the user device, the recording of the live audition associated with a received token;
    comparing a second record of the received token to the first record; and
    verifying the recording of the live audition when the second record matches the first record.

2. The method of claim 1, wherein:
    the audition token is hashed and salted to form the first record; and
    the received token is hashed and salted to form the second record.

3. The method of claim 1, further comprising communicating by the audition server to the user device a tutorial for display on the user device prior the live audition.

4. The method of claim 1, further comprising communicating by the audition server to the user device instructions to delete the audition token after a trial.

5. The method of claim 1, further comprising:
    encrypting communications from the audition server to the user device; and decrypting communications received by the audition server from the user device.

6. The method of claim 1, further comprising:
creating, by the audition server, a further audition token associated with the live audition;
saving, in the database coupled to the audition server, a further first record of the further audition token;
sending, by the audition server, the further audition token to the user device of the performer;
receiving, by the audition server from the user device, a further recording of the live audition associated with a further received token;
comparing a further second record of the further received token to the further first record; and
verifying the further recording of the live audition when the further second record matches the further first record.

7. The method of claim 6, further comprising receiving, by the audition server from the user device, a selection between the recording and the further recording for submission to the live audition.

8. The method of claim 6, wherein the creating of the further audition token is in response to an administrator action.

9. A system for verifying a recording of a live audition, comprising:
an audition server comprising a first processor and a first memory, the first processor, when executing a first set of instructions stored in the first memory, causing the audition server to create an audition token associated with the live audition;
a database coupled to the audition server and configured to save a first record of the audition token;
a communication interface coupled to the audition server and configured to send the audition token to a user device of a performer, the communication interface further configured to receive, from the user device, the recording of the live audition being associated with a received token; and
a second processor configured to compare a second record of the received token to the first record, and further configured to verify the recording of the live audition when the second record matches the first record.

10. The system of claim 9, wherein the second processor is further configured to:
hash and salt the audition token to form the first record; and
hash and salt the received token to form the second record.

11. The system of claim 9, wherein the communication interface is further configured to communicate to the user device a tutorial for display on the user device prior the live audition.

12. The system of claim 9, wherein the communication interface is further configured to communicate to the user device instructions to delete the audition token after a trial.

13. The system of claim 9, wherein the communication interface is further configured to:
encrypt communications from the audition server to the user device; and
decrypt communications received by the audition server from the user device.

14. The system of claim 9, wherein:
the audition server is further configured to create a further audition token associated with the live audition;
the database is further configured to save a further first record of the further audition token;
the communication interface is further configured to send the further audition token to the user device of the performer, the communication interface further configured to receive, from the user device, the further recording of the live audition being associated with a further received token; and
the second processor is further configured to compare a further second record of the further received token to the further first record, and further configured to verify the further recording of the live audition when the further second record matches the further first record.

15. The system of claim 14, wherein the audition server is further configured to receive, from the user device, a selection between the recording and the further recording for submission to the live audition.

16. The system of claim 14, wherein the audition server creates the further audition token in response to an administrator action.

17. A live audition computer-implemented system, comprising:
a processor; and
a memory;
wherein the processor is adapted to execute machine-readable instructions stored in the memory, the machine-readable instructions when executed causing the processor to form:
an organizer database adapted to receive information via an application programming interface (API) from an organizer mobile interface;
a candidate database adapted to receive information via the API from a candidate mobile device; and
a recording and verification module adapted to receive a recording from the candidate mobile device, verify the recording as a unique trial, and provide the recording to the organizer via the organizer mobile interface, the recording and verification module further configured to generate a unique identifier and communicate a unique identifier to the candidate mobile device;
wherein the recording received from the candidate mobile device includes the unique identifier; and
wherein the recording and verification module is further configured to verify the recording as a unique trial by comparing the unique identifier and the unique identifier.

* * * * *